(No Model.) 6 Sheets—Sheet 2.
H. WHITEHEAD & T. DODD.
RAILWAY POINT AND MANNER OF WORKING THE SAME.
No. 254,080. Patented Feb. 21, 1882.

(No Model.) 6 Sheets—Sheet 3.
H. WHITEHEAD & T. DODD.
RAILWAY POINT AND MANNER OF WORKING THE SAME.
No. 254,080. Patented Feb. 21, 1882.

Witnesses
G. R. Holland
H. F. Woodall

Inventors
Henry Whitehead
Thomas Dodd

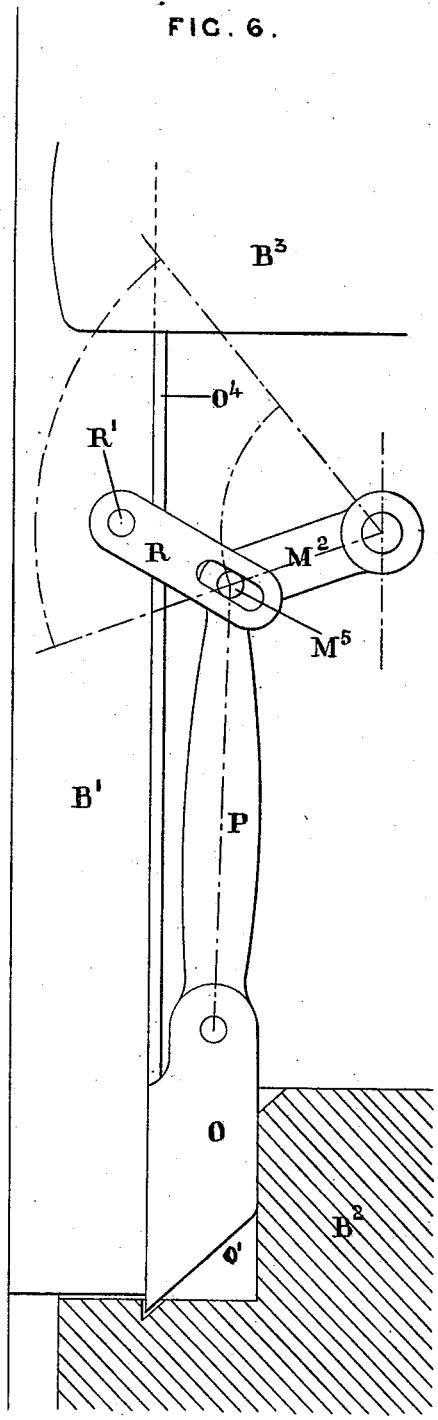

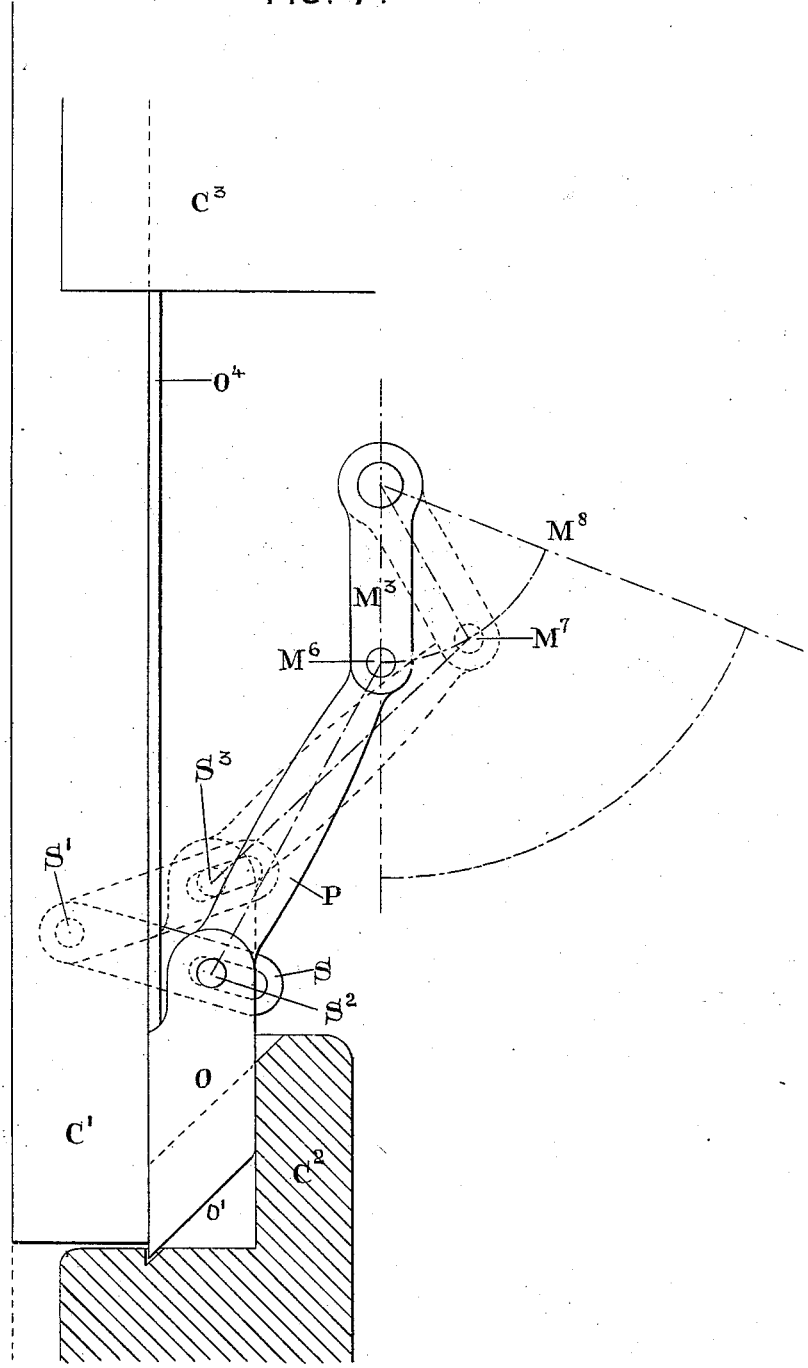

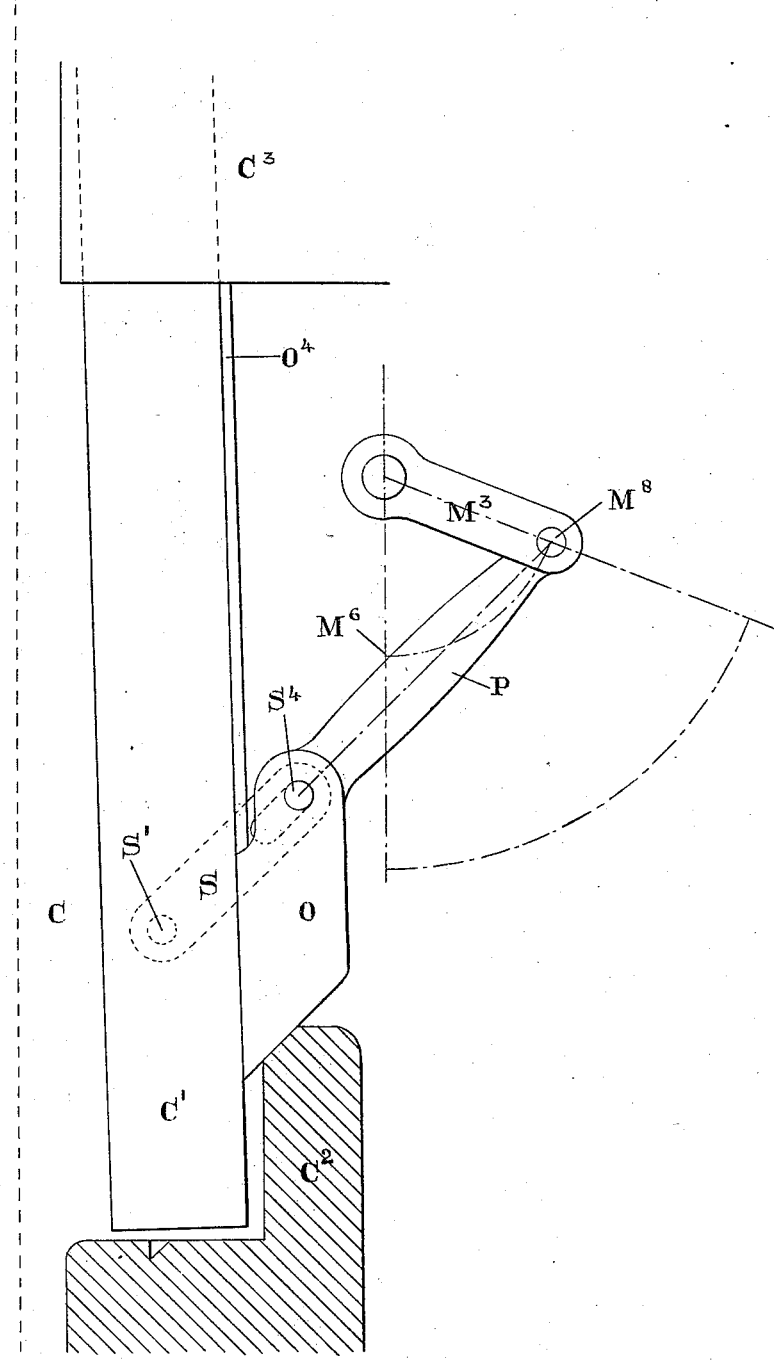

UNITED STATES PATENT OFFICE.

HENRY WHITEHEAD AND THOMAS DODD, OF LONDON, ENGLAND.

RAILWAY-POINT AND MANNER OF WORKING THE SAME.

SPECIFICATION forming part of Letters Patent No. 254,080, dated February 21, 1882.

Application filed August 25, 1881. (No model.) Patented in England April 8, 1881.

*To all whom it may concern:*

Be it known that we, HENRY WHITEHEAD and THOMAS DODD, both subjects of the Queen of Great Britain, and residing at London, England, have jointly invented certain Improvements in Railway-Points and in the Manner of Working the Same, (for which we have received Provisional Protection in Great Britain, dated the 8th day of April, 1881, No. 1,540;) and we do hereby declare that the following is a full, clear, and exact description of the invention.

The object of this invention is, by the means hereinafter described, to cause railway-points to work vertically instead of horizontally, and by our improved vertical action to facilitate the working of trains and to prevent the points employed from getting out of order, and thus to promote safety and speed in railway traveling. We attain these objects by the mechanical arrangements shown and described in the accompanying drawings, in which similar letters of reference are employed to indicate similar parts in the several figures.

Figure 1:
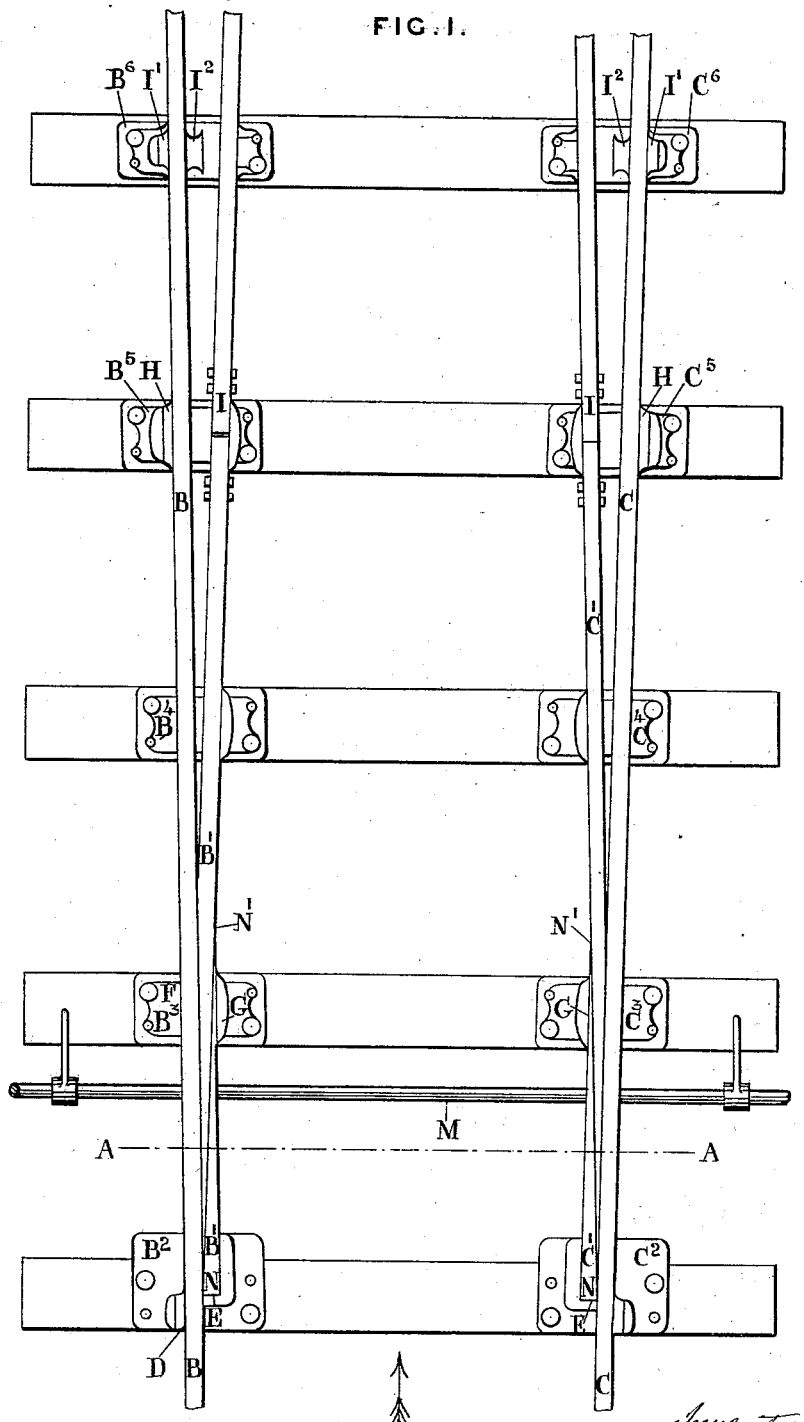
Figure 2:
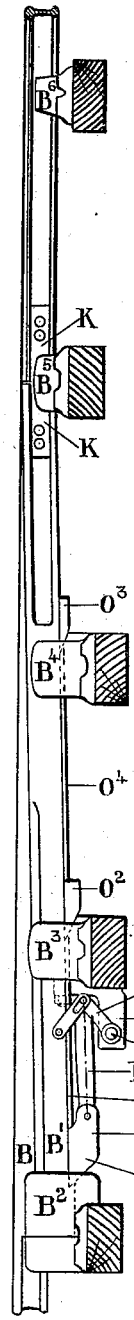
Figure 3:
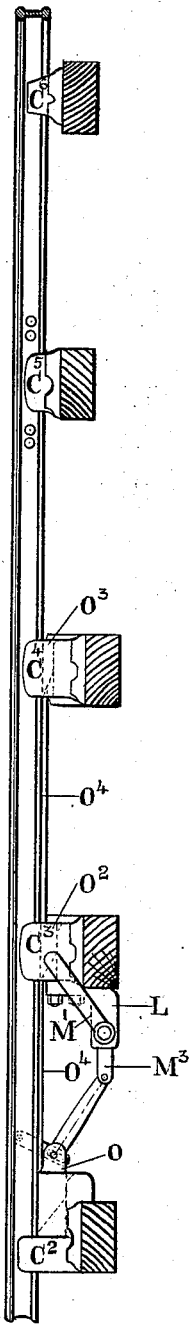
Figure 4:
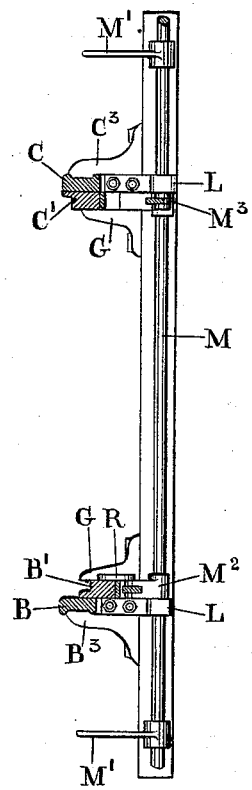

Figure 1 is a plan. Fig. 2 is an elevation of the inner face of the left-hand rail, and Fig. 3 is an elevation of the outer face of the right-hand rail, of railway-points constructed according to our invention, the said rails being situated to the left and right of a person approaching the points in the direction of the arrow on Fig. 1. Fig. 4 is a transverse section on the line A A in Fig. 1. Figs. 5, 6, 7, and 8 are diagrams showing the successive positions of the mechanism during the movement of the actuating lever or handle.

B is the left-hand fixed rail. B' is the left-hand movable rail or point-blade. C is the right-hand fixed rail, and C' is the right-hand movable rail or point-blade. $B^2$ $B^3$ $B^4$ $B^5$ $B^6$ and $C^2$ $C^3$ $C^4$ $C^5$ $C^6$ are ten special chairs for supporting the said rails, five chairs being situated on each side of the track. A description of those of the one side will apply equally well to those of the other side. The first chair, $B^2$, receives the fixed rail B, to which it is keyed at D, and has a recess or pocket, E, in which the point-blade B' moves vertically and by which it is kept in contact with the fixed rail B. The second chair, $B^3$, is bolted to the fixed rail at F, and has a vertical arm, G, forming with the fixed rail a recess for the same purpose as the recess E in the first chair. The third chair, $B^4$, is widened to suit the spread of the two rails, but is otherwise similar to $B^3$. The fourth chair, $B^5$, is keyed to the fixed rail by a key, H, and has a recess to receive the heel of the point-blade B' and the end of the continuation-rail I, together with the fish-plates K, Fig. 2, which secure the adjacent ends of the two rails; or the point-blade may be hinged to the fourth chair by means of a horizontal joint-pin, and the end of the continuation-rail may be keyed to the said fourth chair, the simple nature of which alternative method of attachment renders an illustration of it unnecessary. The fifth chair, $B^6$, is keyed to the fixed rail B by means of the keys I' $I^2$.

To the chairs $B^3$ $C^3$, Figs. 2, 3, and 4, are bolted two brackets, L, in which turn a rock-shaft, M, actuated by means of the lever M', which may either be a hand-lever, or may be connected to a distant hand-lever in a pointman's box or elsewhere in the usual manner.

The point-blades B' C' have for the most part a solid rectangular section; but a wedge-shaped portion is removed from the upper surface of each from N to N', Fig. 1, so as to leave a corresponding wedge-shaped projection, forming the upper bearing-surface of the said point-blade, and the object of the said rock-shaft M is to raise the said point-blade B' and depress the point-blade C', or vice versa, when it is desired to present either point-blade uppermost—as, for instance, the rail C', Fig. 4, for the guidance of the wheels of an approaching vehicle, the simultaneously-depressed point-blade B' allowing the flanges of the opposite wheels of the vehicle to run over the said depressed point-blade without touching it, and to take to the adjacent fixed rail B. The said alternate movements are accomplished in the following manner:

To the rock-shaft M are keyed two levers, $M^2$ $M^3$, situated underneath the point-blades B' C' respectively.

Figure 5:
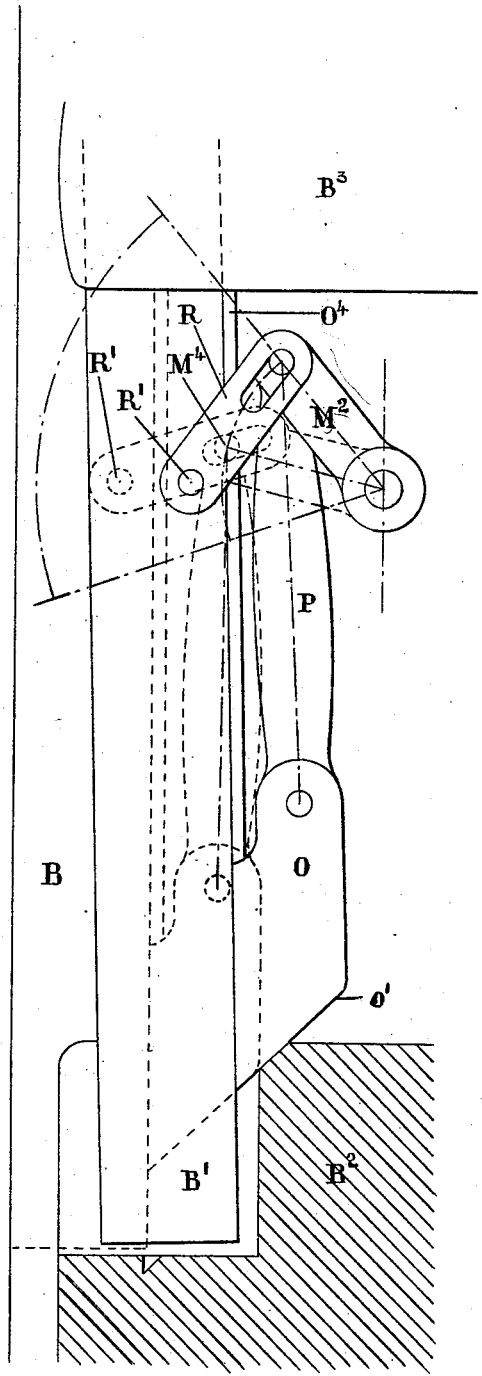

Referring for the present to the point-blade B', Figs. 2, 5, and 6, a rod, P, having suitable joint-pins, connects the lever $M^2$ to a sliding block, O, which has a wedge-shaped end, O', engaging in the recess of the chair B² underneath the point-blade B'. Similar wedge-shaped blocks, O² O³, of varying thicknesses, as shown, engage in the recesses of the chairs B³ and B⁴, and are coupled to each other and to the block O by means of a sliding bar, O⁴. In Fig. 5, as the lever M² moves toward the point M⁴, the rod P pushes the block O into the position shown by the dotted outline of the said block O, the wedge-shaped end O' of which, acting upon the bottom of the recess in the chair B², raises the end of the point-blade B' to the same level as the fixed rail B. At the same time the blocks O² O³, Fig. 2, are moved by the bar O⁴, and, acting in a similar manner, raise the intermediate portions of the point-blade B' to an extent required by the angular motion of the said point-blade hinging in the chair B⁵. As the lever M² continues to advance toward the point M⁵, Fig. 6, the parallel portions of the three blocks O O² O³ are thereby placed underneath the point-plade B', so as to support the weight of a wheel rolling upon it. A link, R, is jointed to the point-blade at R', and has a slot embracing the joint-pin of the lever M². Upon the return of the lever M² from the point M⁵ the parallel portions of the blocks O O² O³ are first withdrawn, and during the latter portion of the movement of the lever M² the link R draws down the point-blade B' into the position from which it was supposed to start in describing Figs. 2 and 5. While the aforesaid movements of the left-hand point-blade are B' taking place the right-hand point-blade is being operated upon in a reverse direction in the following manner—that is to say, while the point-blade B' is being depressed the point-blade C' is being raised, and vice versa. The said point-blade C', Figs. 3 and 8, is already at its highest elevation, and requires to be depressed by the partial revolution of the rock-shaft M, turning through the same arc and in the same direction as in Figs. 5 and 6—that is, from the point M⁶ to the point M⁸, Figs. 7 and 8. The lever M³ is connected to the block O by means of a rod, P, having suitable joint-pins. While the lever M³ moves from the point M⁶ to the point M⁷ the rod P withdraws the parallel part of the block O from the recess in the chair C², and the parallel parts of the blocks O² O³, Fig. 3, from the recesses in their respective chairs, and during the remaining movement the rod P draws down the block O into the position shown in Fig. 8.

The link S is jointed to the point-blade C' at the point S', and its slot embraces the joint-pin of the block O instead of the joint-pin of the lever M², as in Fig. 5. The positions S², S³, and S⁴ in Figs. 7 and 8 show the successive positions of the said link during the downward motion of the lever M³, the latter part of whose motion causes the link S to draw down the point-blade C' to the position shown in Fig. 8. Upon the return of the lever M³ from the point M⁸ to the point M⁶ the movements of the respective parts follow each other in the reverse order to that just described, and the point-blade C' is elevated and substantially supported by the blocks O O² O³, as shown in Fig. 2.

If preferred, the weight of the point-blades B' C' may be counterbalanced by means of a weighted lever or levers applied in any well-known and suitable manner.

Having now fully described our invention and the manner in which it is to be carried into effect, we desire it to be understood that what we claim as our invention, and desire to be secured by Letters Patent, is—

The combination, with the fixed rails, of the chairs secured to said rails, the movable rails B' and C', received in recesses in the chairs, the rock-shaft M, the wedge-shaped blocks connected with lever-arms upon the rock-shaft, and the links connected with the movable rails and with the said levers, said members being organized and adapted to operate substantially as described.

HENRY WHITEHEAD.
THOMAS DODD.

Witnesses:
  G. R. HOLLAND,
    *Patent Solicitor, London.*
  H. F. WOODALL,
    *Clerk to the said G. R. Holland.*